United States Patent [19]

Varshney

[11] 4,384,353
[45] May 17, 1983

[54] METHOD AND MEANS FOR INTERNAL ERROR CHECK IN A DIGITAL MEMORY

[75] Inventor: Ramesh C. Varshney, San Jose, Calif.

[73] Assignee: Fairchild Camera and Instrument Corp., Mountain View, Calif.

[21] Appl. No.: 235,803

[22] Filed: Feb. 19, 1981

[51] Int. Cl.³ .................... G06F 11/10; G11C 29/00
[52] U.S. Cl. ................................................ 371/38
[58] Field of Search .................. 371/38, 37, 39, 40

[56] References Cited

U.S. PATENT DOCUMENTS

| | | | |
|---|---|---|---|
| 3,218,612 | 11/1965 | Sorg, Jr. et al. | 371/39 |
| 3,404,373 | 10/1968 | Srinivasan | 371/40 |
| 3,825,893 | 7/1974 | Bossen et al. | 371/38 |
| 4,077,028 | 2/1978 | Lui et al. | 371/38 |
| 4,249,253 | 2/1981 | Gentili et al. | 371/38 |
| 4,319,356 | 3/1982 | Kocol et al. | 371/38 |

OTHER PUBLICATIONS

Goetze et al., Single Error Correction in CCD Memories, IBM Technical Disclosure Bulletin, vol. 23, No. 1, Jun. 1980, pp. 215–216.
Basham, New Error-Correcting Technique for Solid-State Memories Saves Hardware, Computer Design, Oct. 1976, pp. 110–113.

Primary Examiner—Charles E. Atkinson
Attorney, Agent, or Firm—Kenneth Olsen; Theodore S. Park; Warren M. Becker

[57] ABSTRACT

A semiconductor digital memory such as a charge coupled device is provided with error detection capability. Error logic responsive to a group of data on the input bus generates a first error code which is stored in memory along with the group of data. When the data is retrieved from memory similar error logic generates a second error code. The first and second error codes are compared, and if the codes are identical the data is assumed to be correct. If codes differ then the data is discarded or errors therein are identified and corrected.

3 Claims, 2 Drawing Figures

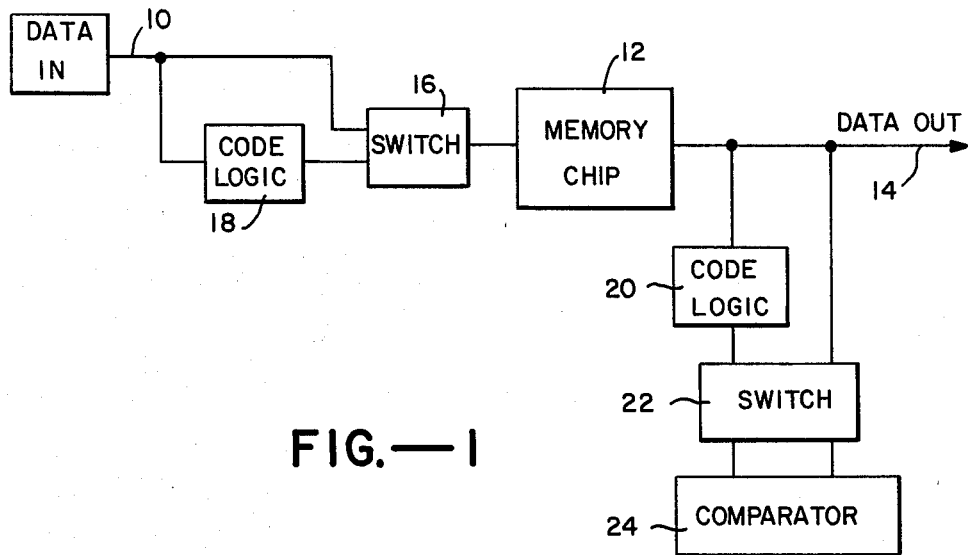
FIG.—1
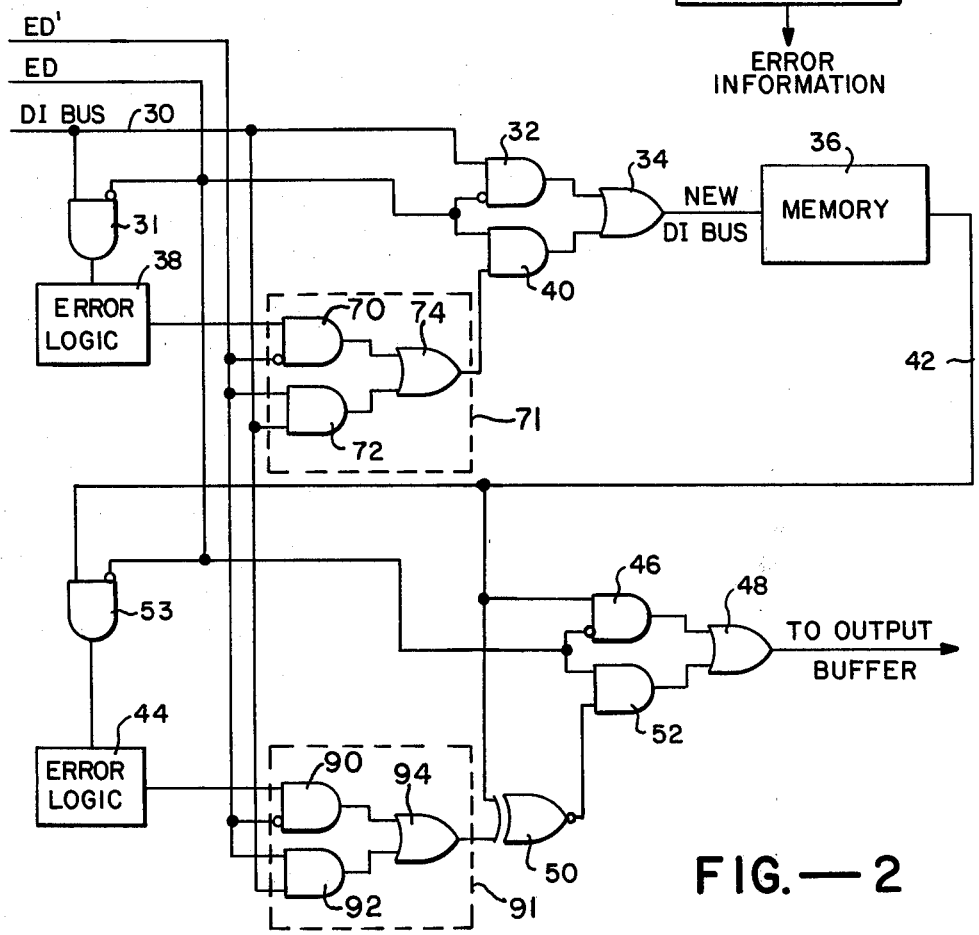
FIG.—2

METHOD AND MEANS FOR INTERNAL ERROR CHECK IN A DIGITAL MEMORY

This invention relates generally to digital electronic memories, and more particularly the invention relates to the detection of errors in data stored in memory.

Digital data comprises a plurality of electronic bits or "1"s and "0"s. The data is typically transmitted in groups and each group is provided with an error code, for example a cyclic redundant check (CRC) code. See pages 5-21 through 5-29 of *Macrologic Bipolar Microprocessor Databook* published by Fairchild Camera and Instrument Corporation, Mountain View, California, 1976. The CRC code is generated by logic circuitry in response to the unique digital data in the associated group. For example, the CRC code can be generated by dividing the received data by a divisor with the remainder being the code. The integrity of data can be determined by comparing the received CRC code with a regenerated CRC code. If the received CRC code and the regenerated CRC code are identical then the data is assumed to be good. Otherwise, the data is not used unless an error is found and corrected. Often, the data is retransmitted.

Digital data can be accurately received and stored in memory, but the data may deteriorate in the memory device. For example, in charge coupled device (CCD) memories errors can occur in recorded data due to alpha particles, noise, and the like during the storage of data. Thus, data may be accurately stored but environmental conditions can deteriorate the stored data.

An object of the present invention is a method of checking the accuracy of data retrieved from a digital memory.

Another object of the invention is a digital memory having self-contained error checking capability.

Briefly, a memory device such as a CCD integrated memory chip is provided with logic means at the data input for generating an error check code for data being written into the memory. After the recording of the data the error check code is written into the memory for subsequent retrieval with the data. A similar logic means is provided at the data output for regenerating an error check code from the data read from the memory. This error check code is then compared with the error check code read from the memory. If the codes are identical the data as read is assumed to be correct, otherwise, the data is discarded or errors therein are located and corrected.

In an alternative arrangement, the error code from memory can be compared with an externally supplied error code and the error code logics (at the input and at the output) are disregarded. This can be advantageous when error identification cannot be accomplished from the limited number of bits of the on chip generated error code and a different error code or a similar but longer error code is used.

The invention and objects and features thereof will be more readily understood from the following detailed description and appended claims when taken with the drawing, in which:

FIG. 1 is a functional block diagram of a digital memory having internal error check capability in accordance with the present invention, and FIG. 2 is a functional block diagram of a charge coupled device memory having error detection capability in accordance with one embodiment of the invention.

Referring now to the drawings, FIG. 1 is a functional block diagram of a digital memory in accordance with the invention. Data is transmitted to the memory on transmission line 10 for storage in the memory 12, and data is read from memory 12 on a data output line 14. As a group of data is transmitted to the memory 12 through a switch 16, the data is also applied to a code logic circuitry 18 which responds to the unique pattern of "1"s and "0"s in the group of data and generates a digital code. For example, a group of data may comprise a several thousand bit data word, and the logic code generated therefrom may be a 16 bit code generated in response to logic circuitry dividing the word by a digital divisor. See the *Macrologic Bipolar Microprocessor Databook,* supra.

Following the application of the group of data through switch 16 to the memory 12, code logic generated for the group of data is then transmitted from the logic 18 through switch 16 for storage in the memory 12 following the data.

At a later time the data is retrieved from memory on the data output line 14 in the same sequence as the data is written. As the group of data is read from memory, the data is applied to another code logic circuitry 20 which generates a similar code as the logic 18 in response to the data. Thus, as the group of data is read from memory 12 a second logic code is generated by the logic 20 in response to the unique pattern of data bits. Following the reading of the group of data from memory 12, the stored error code and the second error code are applied through a switch 22 to a comparator 24. If the stored error code and the second generated error code are identical the data from memory is assumed to be correct. However, if the error codes differ, it is assumed that the data retrieved from memory has an error, the data is then discarded or the error therein is identified and corrected.

FIG. 2 is a functional block diagram of an embodiment of the invention designed for use with CCD memories, such as, for example, the F464 CCD memory produced by Fairchild Camera and Instrument Corporation. In the input circuitry, the data input (DI) bus 30 is connected through an AND gate 32 and an OR gate 34 to the CCD memory 36. The DI bus 30 is also connected through an AND gate 31 to the input error logic 38 whose error code output is supplied to the memory 36 through control logic 71, an AND gate 40, and OR gate 34. Control logic 71 consists of two AND gates 70 and 72 and an OR gate 74 which receives the outputs of AND gates 70 and 72 and supplies its output to AND gate 40. Gate 70 receives the output of error logic 38, while gate 72 is connected to input bus 30.

AND gates 31, 32, and 40 are controlled with a digital error detection (ED) signal which is inverted and applied to gates 31 and 32 and is applied directly to gate 40. Control logic 71 is controlled by a digital control (ED') signal which is inverted and applied to gate 70 and is applied directly to gate 72. During error detection operation using error logic 38, the ED' signal is low (logical "0"). When the ED signal is also low (logical "0"), data on the bus 30 is provided to both memory 36 and error logic 38 which generates an error code from the input data according to the desired algorithm. When the ED signal is high (logical "1") the error code from error logic 38 is provided to the memory 36.

More particularly, error logic 38 generates the error code as data from the bus 30 is being written into memory 36. During this time, the ED signal is low so as to enable gate 32 and disable gate 40. After the predetermined number of data bits are transmitted to memory 36 for storage in a designated block, the ED signals goes high to enable gate 40 and disable gates 31 and 32. The error code from logic 38 is then written into memory 36 in association with the designated block of data. Bringing the ED signal high also acts to automatically reset error logic 38. This is accomplished through gate 31 which produces a low (logical "0") output when the ED signal is high. This low output is applied to error logic 38 for at least n bits where n is the number of bits in the error code generated by the error logic 38.

The output circuitry is similar to the input circuitry. Output data on the output data bus 42 from the memory 36 is transmitted through an AND gate 46 and an OR gate 48 to an output buffer. The output bus 42 is also connected through an AND gate 53 to the output error logic 44 which acts on the data with the same algorithm as input error logic 38. The output of error logic 44 is supplied through control logic 91 to an exclusive NOR gate 50. Control logic 91 consists of AND gates 90 and 92 and OR gate 94 connected in the same manner as AND gate 70 and 72 and OR gate 74, respectively, of control logic 71. Gate 90 receives the output of error logic 44 and provides an input to gate 94, while gate 92 receives the data on DI bus 30 and provides another input to gate 94.

AND gates 46 and 53 are controlled by the ED signal in the same manner as AND gates 32 and 31, respectively. Likewise, AND gates 90 and 92 of control logic 91 are controlled by the ED' signal in the same manner as AND gates 70 and 72, respectively, of control logic 71. As with error logic 38, the ED' signal is low during error detection operation using error logic 44. When the ED signal is also low, output data from memory 36 on output line 42 is provided to the output buffer and to error logic 44. The error code is regenerated in error logic 44 during this time.

When the ED signal goes high which occurs after the predetermined number of data bits are read from memory 36, the regenerated error code is transmitted through control logic 91 by way of the output of gate 94 to gate 50. During this time, the error code stored in memory 36 (and originally generated in error logic 38) is also transmitted by output bus 42 to gate 50. The regenerated error code and the stored error code are compared bit by bit in gate 50. When the comparable bits of the two error codes are identical, gate 50 generates a logical "1" output. However, upon a mismatch in the comparable bits of the two error codes, gate 50 supplies a logical "0" output.

The output of exclusive NOR gate 50 is supplied through an AND gate 52 and OR gate 48 to the output buffer. And gate 52 is controlled by the ED signal in the same manner as AND gate 40. Thus, when the ED signal is high, the logical "1" or "0" output of gate 50 is transmitted to the output buffer whose output is accessible by the user. The logical "1" indicates no error, whereas the logical "0" indicates an error between the two error codes.

In an alternative mode of operation, the error code generation capability of error logics 38 and 44 is overridden while retaining the comparator operation of exclusive NOR gate 50 for comparing externally supplied error codes. In this mode of operation, the ED' signal is raised to its high value (logical "1") which disables gates 70 and 90 in control logics 71 and 91, respectively, and thereby deactivates error logics 38 and 44, respectively, by not transmitting any information supplied from their outputs. At the same time, gates 72 and 92 in control logic 71 and 91, respectively, are enabled. This permits the passage of information on DI bus 30 through control logics 71 and 91, respectively, to memory 36 and gate 50, respectively. More particularly, a first external error code is supplied from input bus 30 through gates 72, 74, 40, and 34 to memory 36 where this first error code is stored. At a later time, the first external error code stored in memory 36 is supplied on data output line 42 to gate 50. At the same time, a second external error code which is identical to the first external error code is transmitted through DI bus 30 and gates 92 and 94 to gate 50 where the two externally supplied error codes are compared bit by bit in the manner described above to determine if there is an error in the data stored in memory 36. In this alternate mode, the ED signal controls the transmission of the main memory data in the error data through gates 32, 40, and 34 in the input circuitry and through gates 46, 52, and 48 in the output circuitry in the same manner as that described above for the principal embodiment.

The ED' signal may be generated by a third voltage level on the ED signal in a manner similar to that shown in FIG. 3 of my U.S. Patent application "Method and Means for Diagnostic Testing of CCD Memories." To generate the ED' signal, only the comparator 26 of FIG. 3 of this application is required. For example, the ED signal is an external signal usually lower than the supply voltage $V_{DD}$ for both logical "0" and logical "1"; at those values for the ED' signal, logical "0" is generated for the ED signal. When it is desired to raise the ED' signal to logical "1", the external (ED) signal is raised above supply voltage $V_{DD}$.

When no error detection capability at all is desired, the ED signal is held at ground reference.

Error detection capability in accordance with the present invention is readily embodied in a semiconductor memory chip. While the invention has been described with reference to specific embodiments, this description is illustrative of the invention and is not to be construed as limiting the invention. Various modifications and applications may occur to those skilled in the art without departing from the true spirit and scope of the invention as defined by the appended claims.

What is claimed is:

1. An error detection apparatus responsive to an ED signal, an ED' signal, data and an external error check code received from an external source, with means for coupling said apparatus to a memory having a storing cycle and a reading cycle and an output buffer, comprising:

means, responsive to said ED signal, said ED' signal, said data and said external error check code for generating a first internal error check code and storing said data and said external error check code in said memory during said storing cycle and for generating a second internal error check code and reading said data and said external error check code from said memory to said output buffer during said reading cycle when both said ED signal and said ED' signal are low; and means, including comparing means, responsive to said ED signal, said ED' signal, said external error check code, said first internal error check code and, said second internal error check code for:
(a) storing said first internal error check code in said memory during said storing cycle and comparing said first internal error check code stored in said memory and said second internal error check code and reading the results of said comparison to said output buffer during said reading cycle when said ED signal is high and said ED' signal is low; and
(b) storing said external error check in said memory during said storing cycle and comparing said external error check code stored in said memory and an external error check code received from said external source and reading the results of said comparison to said output buffer during said reading cycle when both said ED and said ED' signals are high.

2. An apparatus according to claim 1 wherein said means comprises logic means.

3. An apparatus according to claim 2 wherein said logic means are embodied in an integrated circuit means.

* * * * *